(12) United States Patent
Morgan (10) Patent No.: US 11,115,458 B2
(45) Date of Patent: Sep. 7, 2021

(54) MONITORING IN COMPOSITE REQUEST SYSTEMS

(71) Applicants: Atlassian Pty Ltd., Sydney (AU); Atlassian Inc., San Francisco, CA (US)

(72) Inventor: Benjamin Edwin Morgan, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 17/133,464

(22) Filed: Dec. 23, 2020

(65) Prior Publication Data

US 2021/0194948 A1    Jun. 24, 2021

(30) Foreign Application Priority Data

Dec. 24, 2019 (AU) ................................ 2019904933

(51) Int. Cl.
*H04L 29/06* (2006.01)
*H04L 29/08* (2006.01)
*G06F 15/16* (2006.01)

(52) U.S. Cl.
CPC ............ *H04L 67/02* (2013.01); *H04L 67/28* (2013.01); *H04L 67/42* (2013.01)

(58) Field of Classification Search
USPC ................................................ 709/203, 245
See application file for complete search history.

(56) References Cited

U.S. PATENT DOCUMENTS

| 6,757,681 B1* | 6/2004 | Bertram ................ H04L 43/022 |
| 8,849,825 B1* | 9/2014 | McHugh ............. G06F 16/2255 707/737 |
| 10,445,136 B1* | 10/2019 | Roskind ................ G06F 9/4881 |
| 10,606,642 B1* | 3/2020 | Franklin ................ G06F 1/206 |
| 2003/0014568 A1* | 1/2003 | Kishi .................. G06F 11/2074 710/4 |
| 2006/0064459 A1* | 3/2006 | Matsushima ....... H04L 67/2833 709/203 |
| 2007/0271369 A1* | 11/2007 | Aydin ................. G06F 11/2294 709/224 |
| 2010/0005124 A1* | 1/2010 | Wagner .................. G06F 16/27 707/E17.005 |
| 2016/0112515 A1* | 4/2016 | Ohara ................. H04L 67/1097 709/203 |
| 2017/0147231 A1* | 5/2017 | Jung ..................... G06F 3/0611 |
| 2020/0278881 A1* | 9/2020 | Mathur .................. G06Q 40/12 |

* cited by examiner

*Primary Examiner* — Jude Jean Gilles
(74) *Attorney, Agent, or Firm* — Brownstein Hyatt Farber Schreck, LLP (57) ABSTRACT

Described herein is a computer implemented method for generating a composite response. The method comprises receiving a composite request defining one or more operations and generating a composite response by, for each operation: executing the operation using one or more server side resources; receiving execution result data; writing operation response data to the composite response; determining a status code providing information on at least one of the one or more server side resources used to execute the operation; and associating the status code with the operation response data in the composite response.

20 Claims, 7 Drawing Sheets

MONITORING IN COMPOSITE REQUEST SYSTEMS

CROSS-REFERENCE TO RELATED APPLICATION(S)

This application claims the benefit of Australian patent application no. AU2019904933, filed Dec. 24, 2019 and titled "Monitoring in Composite Request System," the disclosure of which is hereby incorporated herein by reference in its entirety.

FIELD

The present disclosure is directed to monitoring in composite request systems.

BACKGROUND

Various monitoring tools exist for monitoring server performance Many of these tools rely on HTTP status codes to work.

Where, for example, a server runs on a Representational State Transfer (REST) architecture, existing systems use HTTP status codes to monitor server performance. Under a REST architecture, each resource made available by a server is identified by a URL. To retrieve data a client sends a get request to the relevant URL and gets a response which includes a HTTP status code (e.g. code 200 indicating success, code 500 indicating a problem with the server). The status codes can be monitored by monitoring tools to determine, for example, the uptime of the web server.

Background information described in this specification is background information known to the inventors. Reference to this information as background information is not an acknowledgment or suggestion that this background information is prior art or is common general knowledge to a person of ordinary skill in the art.

SUMMARY

Described herein is a computer implemented method for generating a composite response, the method comprising: receiving, from a client system, a composite request defining one or more operations; and generating a composite response in respect of the composite request by, for each operation in the composite request: executing the operation using one or more server side resources; receiving execution result data from the one or more server side resources in response to execution of the operation; writing operation response data to the composite response, the operation response data based on the execution result data; determining a status code for the operation based on the execution result data, the status code providing information on at least one of the one or more server side resources used to execute the operation; and associating the status code with the operation response data in the composite response.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

Many monitoring tools use Hypertext Transfer Protocol (HTTP) status codes to monitor servers. For example, HTTP status code 500 indicates an internal server error. If a monitoring tool observes multiple 500 status codes occurring within a short period of time this may cause an alert or notification to be sent to the system administrator. As noted above, such an approach works well where individual requests map to individual server-side processes and result in individual HTTP status codes being generated (e.g. in a REST architecture).

The present disclosure, however, deals with server architectures that allow for a single HTTP request (which will be referred to as a composite request) to define one or more operations. When a composite request is processed by a receiving server, a given operation can trigger one or more server-side processes which involve one or more server-side resources. Such architectures will be referred to herein as composite request system (CRS) architectures.

GraphQL is one example of a CRS architecture, and will be used to illustrate various features of the present disclosure. The features described herein can, however, be adapted and used with other CRS architectures.

As noted, the term composite request system (CRS) architecture will be used herein to refer to client server architectures that allow for individual requests to define one or more operations, each operation triggering one or more server-side processes involving one or more server-side resources.

Continuing with this terminology, and for ease of reference: a client/server system making use of a CRS architecture will be referred to as a CRS system; client requests and server responses in a CRS will be referred to as composite requests and composite responses; a server application that configures a server system to receive and respond to composite requests will be referred to as a CRS server application (and a server system running such an application a CRS server); a client module that configures a client system to generate composite requests and receive composite responses will be referred to as a CRS client module (and a client system running such an application a CRS client). It should be noted that while a single composite request can define multiple operations it need not: i.e. a composite request could define a single operation.

For monitoring tools that rely on HTTP status codes, composite request systems are problematic. This is due to the fact that although a single request can include multiple operations and involve multiple server side resources, the response to the request is associated with a single HTTP status code.

For example, a single composite request may include an operation (or multiple operations) that, ultimately, involves five different server-side resources. At the server side, four of those server-side resources may fail for various reasons and only one operation be successfully processed. The HTTP status code associated with the composite response, however, will (in most instances) still be 200: status ok. As such, any monitoring tool will not detect any server error, even though four of the queries in the request failed.

To illustrate this, consider the following example of a composite request (in GraphQL):

```
query {
  roadmaps {
    roadmapForSource(source: "<resource identifier>") {
      roadmapId
    }
  }
}
```

Such a request could be made to a CRS server in a HTTP POST request to /GraphQL with a body, for example: {"query":"{\n roadmaps {\n roadmapForSource(source: \"<resource identifier>"){\n roadmapId\n}\n}\n}\n","variables":null}

In order to process/respond to this request, the CRS server queries the roadmaps data source. The CRS server then generates and communicates a composite response. Typically, if successful, the response is accompanied by a single HTTP status code, for example 200.

As another example, consider the following example composite request (in GraphQL):

```
featureFlagInformation(issueId:12123){
    featureFlags {
      id
    }
  }
  roadmaps {
    roadmapForSource(source: "<resource identifier>") {
    roadmapId
    }
  }
}
```

This request too could be made to a CRS server in a HTTP POST request to /GraphQL with a body, for example: {"query":"{\n featureFlagInformation(issueId:12123){\n featureFlags {\n id\n}\n}\n roadmaps {\n roadmapForSource(source: \"<resource identifier>") {\n roadmapId\n}\n}\n}\n", "variables":null}

In order to process/respond to this request, the CRS server must query two server side resources (which maybe separate systems or databases): one for roadmaps and one for featureflags. The CRS server then generates and communicates a composite response. Typically, if communication with the GraphQL endpoint is successful, the response is accompanied by a single HTTP status code, for example 200. This is regardless of whether one or both of the server side resources involved in responding to the request (i.e. the roadmaps and featureflags resources) fail.

Figure 1:
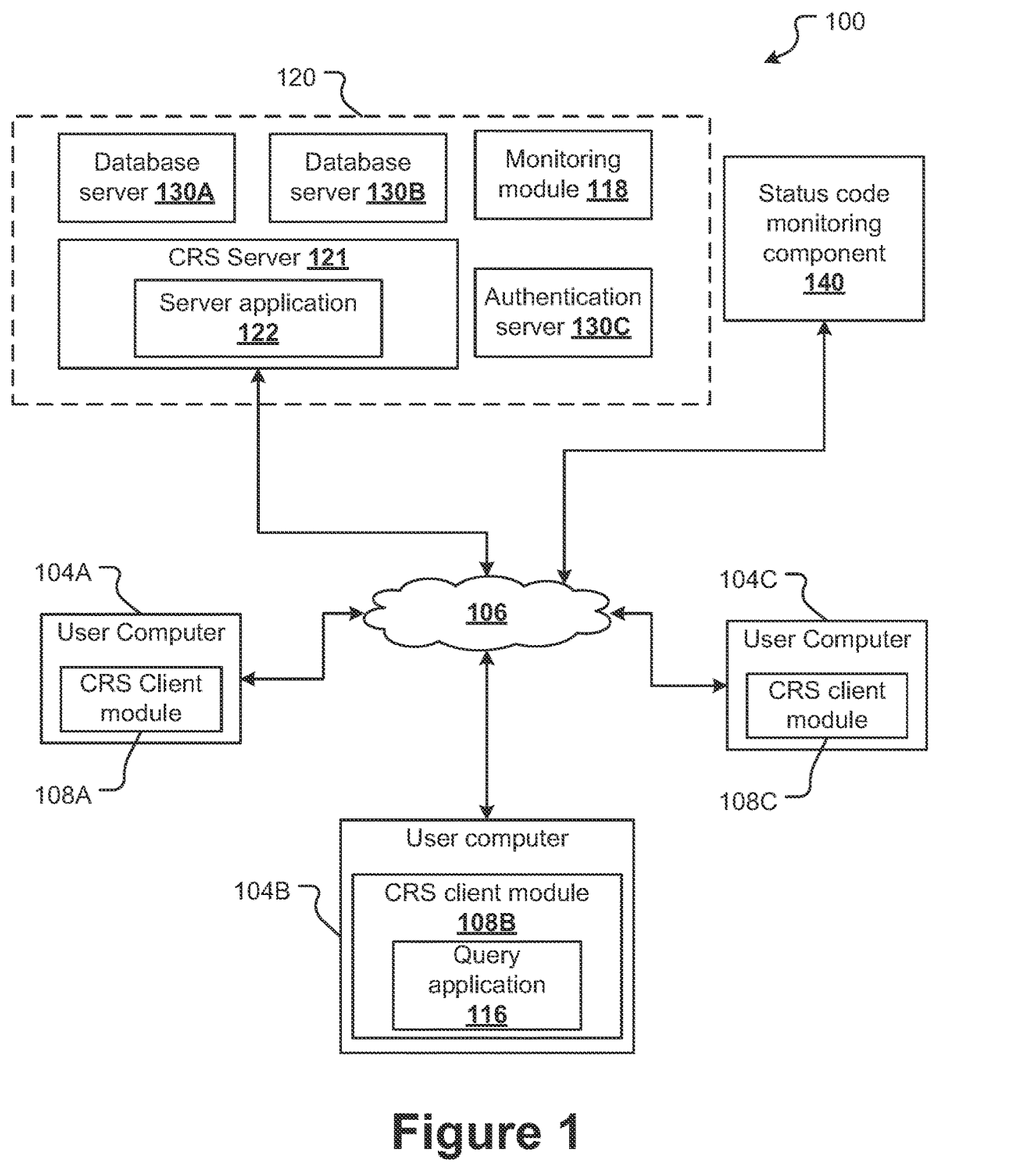
FIG. 1 is a diagram depicting a networked environment in which various features of the present disclosure may be implemented.

FIG. 1 depicts one example of a networked environment 100 in which the various operations and techniques described herein can be performed.

Networked environment 100 includes a number of user computers 104 (in this example three: 104A, 104B, 104C) and a server environment 120.

User computers 104A, 104B, 104C host CRS client modules 108A, 108B, 108C respectively, which, when executed by the corresponding user computer 104A, 104B, 104C, configures the user computer 104A,104B,104C to provide client-side functionality/interact with the server environment 120 (or, more specifically, a CRS server 121 and a server application 122 operating therein).

The client modules 108A, 108B, 108C may be a general web browser application (such as Chrome, Safari, Internet Explorer, Opera, or an alternative web browser application) which accesses the CRS server application 122 via an appropriate uniform resource locator (URL) and communicates with the CRS server application 122 via general world-wide-web protocols (e.g. http, https, ftp). Alternatively, the client modules 108A, 108B, 108C may be a specific application programmed to communicate with the CRS server application 122 using defined application programming interface (API) calls.

A given user computer 104A, 104B, 104C may have more than one CRS client modules 108A, 108B, 108C, for example both a general web browser application and a dedicated programmatic client module. The CRS client module may comprise an additional specific module query application 116 which handles the construction, client-side validation, and communication of composite requests to the CRS server application 122.

Server environment 120 includes a CRS server 121 which hosts a CRS server application 122. The CRS server application is executed by the CRS server 121 to configure it to provide server-side functionality to one or more corresponding client modules (e.g. 108A, 108B, 108C as discussed above). The CRS server application 122 comprises one or more application programs, libraries, APIs or other software elements that implement the features and functions that are described herein. For example, where the CRS architecture is GraphQL, the CRS server application 121 will provide GraphQL API, for example by implementation of a platform such as Apollo.

In this disclosure, the server environment 120 also maintains a monitoring module 118 configured to process composite responses and generates/communicates an error report to a monitoring component 140 that includes status codes (e.g. http status codes) that the monitoring component 140 is configured to receive and process.

Server environment 120 includes additional server-side resources 130 which are used/accessed by the CRS server 121 to process and respond to CRS requests. A given server side resource 130 may run on the same computer processing system as the CRS server application 122 or on a different computer processing system (and be in communication with the CRS server application 122 via a direct or networked communication channel).

By way of example, server-side resources 130 in environment 120 include a database server 130A, a database server 130B, and an authentication server 130C, all of which provide access to data or services relevant to the services being offered by the CRS server 121. Server environment 120 may include any other type of system/service/resource—for example, a public API including a corresponding service with its own data store, a private API including a corresponding service with its own data store, and private REST API including a corresponding service with its own data store.

The CRS server 121 and server-side resources 130 are referred to and shown as being part of a server environment 120. The computer systems on which the server 121 and server-side resources 130 run may physically co-located and/or in different physical locations. Similarly, the computer systems on which the server 121 and server-side resources 130 run may be on a common network (e.g. a local area network) or on different networks (in communication with each other via a network such as the Internet). Relevantly, the CRS server 121 can communicate with the server-side resources 130 in order to respond to CRS requests it receives.

Environment 100 further includes a status code monitoring component 140 (or monitoring component 140 for short). In this context, a status code monitoring component is a component (e.g. a system, tool, software application, or other component) which is configured to perform monitoring based on status codes. The monitoring component 140 may be part of the server environment 120 or independent thereof (e.g. controlled and operated by a $3^{rd}$ party providing monitoring services).

The user computers 104A, 104B, 104C and CRS server 121 communicate data between each other either directly or indirectly through one or more communications networks 106. Communications network 106 may comprise a local area network (LAN), a public network, or a combination of networks.

While the CRS server 121 of environment 100 is depicted and described as a single server machine alternative architectures are possible. For example, in certain cases a clustered server architecture may be used where multiple server computing instances (or nodes) are instantiated on one or more computer processing systems to meet system demand. Conversely, in the case of small enterprises with relatively simple requirements the CRS server 121 may be a stand-alone implementation (i.e. a single computer directly accessed/used by end users).

A user computer 104A, 104B, 104C may be any computer processing system which is configured (or configurable) by hardware and/or software to offer client-side functionality. Similarly, CRS server 121 may be any computer processing system which is configured (or configurable) by hardware and/or software to provide server-side functionality. Other server-side resources (e.g. databases 130 and 132) will also be provided by/run on a computer processing system. Typically server systems are more powerful (from a computer processing perspective) than client systems but this is not necessarily the case. By way of example, suitable user (client) and/or server systems may include: server computer systems, desktop computers, laptop computers, netbook computers, tablet computing devices, mobile/smart phones, personal digital assistants, personal media players, set-top boxes, games consoles.

One example of a computer processing system is described below with reference to FIG. 2.

The present invention is necessarily implemented using one or more computer processing systems.

Figure 2:
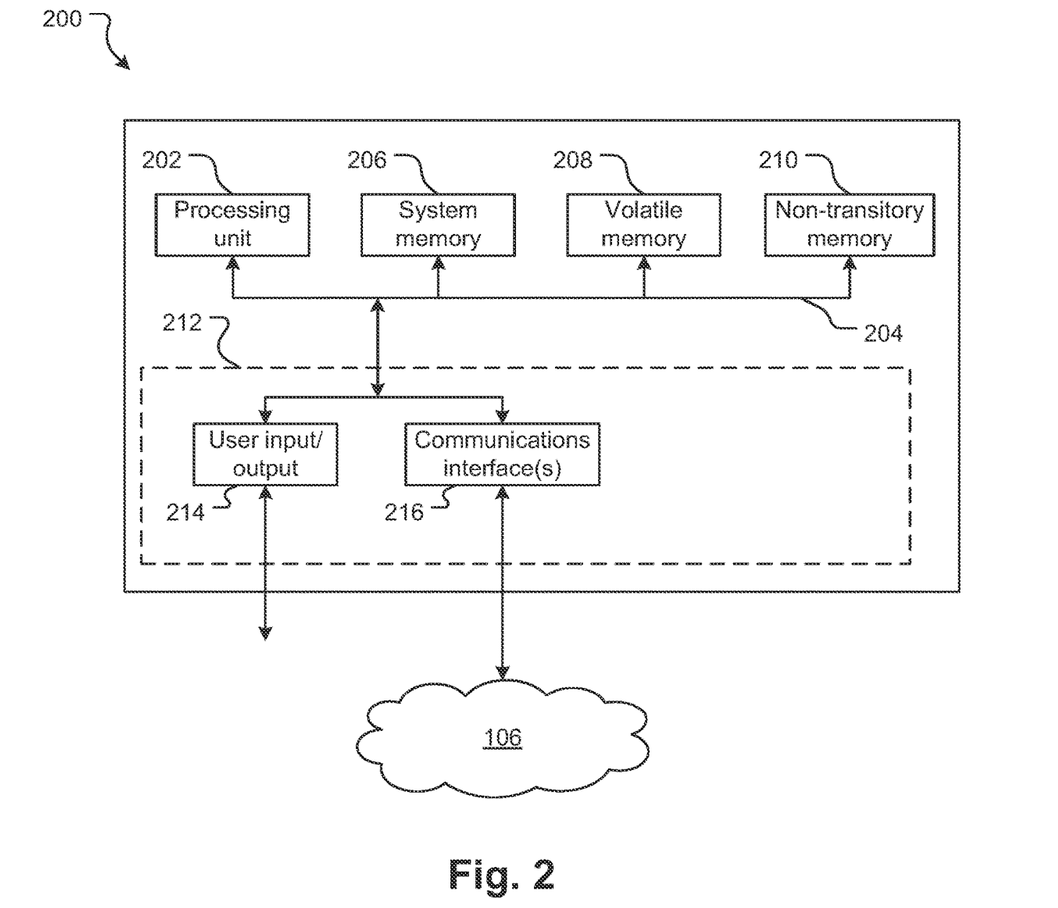
FIG. 2 is a block diagram of a computer processing system configurable to perform various features of the present disclosure.

FIG. 2 provides a block diagram of one example of a computer processing system 200. Computer processing system 200 may, for example, be configured for use as the CRS server 121, a user computer (such as 104A, 104B, or 104C) or other server-side resource 130 as described above.

System 200 as illustrated in FIG. 2 is a general-purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing aspects of the invention may have additional, alternative, or fewer components than those depicted, combine two or more components, and/or have a different configuration or arrangement of components.

The computer processing system 200 includes at least one processing unit 202. The processing unit 202 may be a single computer-processing device (e.g. a central processing unit, graphics processing unit, or other computational device), or may include a plurality of computer processing devices. In some instances all processing will be performed by processing unit 202, however in other instances processing may also, or alternatively, be performed by remote processing devices accessible and useable (either in a shared or dedicated manner) by the system 200.

Through a communications bus 204 the processing unit 202 is in data communication with a one or more machine-readable storage (memory) devices that store instructions and/or data for controlling operation of the processing system 100. In this instance system 200 includes a system memory 206 (e.g. a BIOS), volatile memory 208 (e.g. random access memory such as one or more DRAM modules), and non-transitory (or non-volatile memory) 210 (e.g. one or more hard disk or solid state drives).

System 200 also includes one or more interfaces, indicated generally by 212, via which system 200 interfaces with various devices and/or networks. Generally speaking, other devices may be physically integrated with system 200, or may be physically separate. Where a device is physically separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 200 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

Generally speaking, the devices to which system 200 connects—whether by wired or wireless means—allow data to be input into/received by system 200 for processing by the processing unit 202, and data to be output by system 200. Example devices are described below, however it will be appreciated that not all computer-processing systems will include all mentioned devices, and that additional and alternative devices to those mentioned may well be used.

For example, system 200 may include or connect to one or more input devices by which information/data is input into (received by) system 200. Such input devices may include physical buttons, alphanumeric input devices (e.g. keyboards), pointing devices (e.g. mice, track pads and the like), touchscreens, touchscreen displays, microphones, accelerometers, proximity sensors, GPS devices and the like. System 200 may also include or connect to one or more output devices controlled by system 100 to output information. Such output devices may include devices such as indicators (e.g. LED, LCD or other lights), displays (e.g. CRT displays, LCD displays, LED displays, plasma displays, touch screen displays), audio output devices such as speakers, vibration modules, and other output devices. System 200 may also include or connect to devices which may act as both input and output devices, for example memory devices (hard drives, solid state drives, disk drives, compact flash cards, SD cards and the like) which system 200 can read data from and/or write data to, and touch-screen displays which can both display (output) data and receive touch signals (input).

System 200 may also connect to communications networks (e.g. the Internet, a local area network, a wide area network, a personal hotspot etc.) to communicate data to and receive data from networked devices, which may themselves be other computer processing systems.

It will be appreciated that system 200 may be any suitable computer processing system such as, by way of non-limiting example, a desktop computer, a laptop computer, a netbook computer, tablet computer, a smart phone, a Personal Digital Assistant (PDA). Typically, system 200 will include at least user input and output devices 214 and a communications interface 216 for communication with a network (e.g. network 106). The number and specific types of devices which system 200 includes or connects to will depend on the particular type of system 200. For example, if system 200 is a desktop computer it will typically connect to physically separate devices such as (at least) a keyboard, a pointing device (e.g. mouse), a display device (e.g. a LCD display). Alternatively, if system 200 is a laptop computer it will typically include (in a physically integrated manner) a keyboard, pointing device, a display device, and an audio output device. Further alternatively, if system 200 is a tablet device or smartphone, it will typically include (in a physically integrated manner) a touchscreen display (providing both input means and display output means), an audio output device, and one or more physical buttons.

System 200 stores or has access to instructions and data which, when processed by the processing unit 202, configure system 200 to receive, process, and output data. Such instructions and data will typically include an operating system.

System 200 also stores or has access to instructions and data (i.e. software) which, when processed by the processing unit 202, configure system 200 to perform various computer-implemented processes/methods in accordance with embodiments as described below. It will be appreciated that in some cases part or all of a given computer-implemented method will be performed by system 200 itself, while in other cases processing may be performed by other devices in data communication with system 200.

Instructions and data are stored on a non-transitory machine-readable medium accessible to system 200. For example, instructions and data may be stored on non-transitory memory 210. Instructions may be transmitted to/received by system 200 via a data signal in a transmission channel enabled (for example) by a wired or wireless network connection.

Computer implemented methods that can be performed to monitor server side resources in a composite request system will now be described.

Initially, and with reference to FIG. 3A, the generation of a composite response including status codes will be described. Following this, and with reference to FIG. 3B, processing a composite response with status codes to generate an error report (and communicate the error report to a monitoring component such as 140) is described.

Figure 3A:
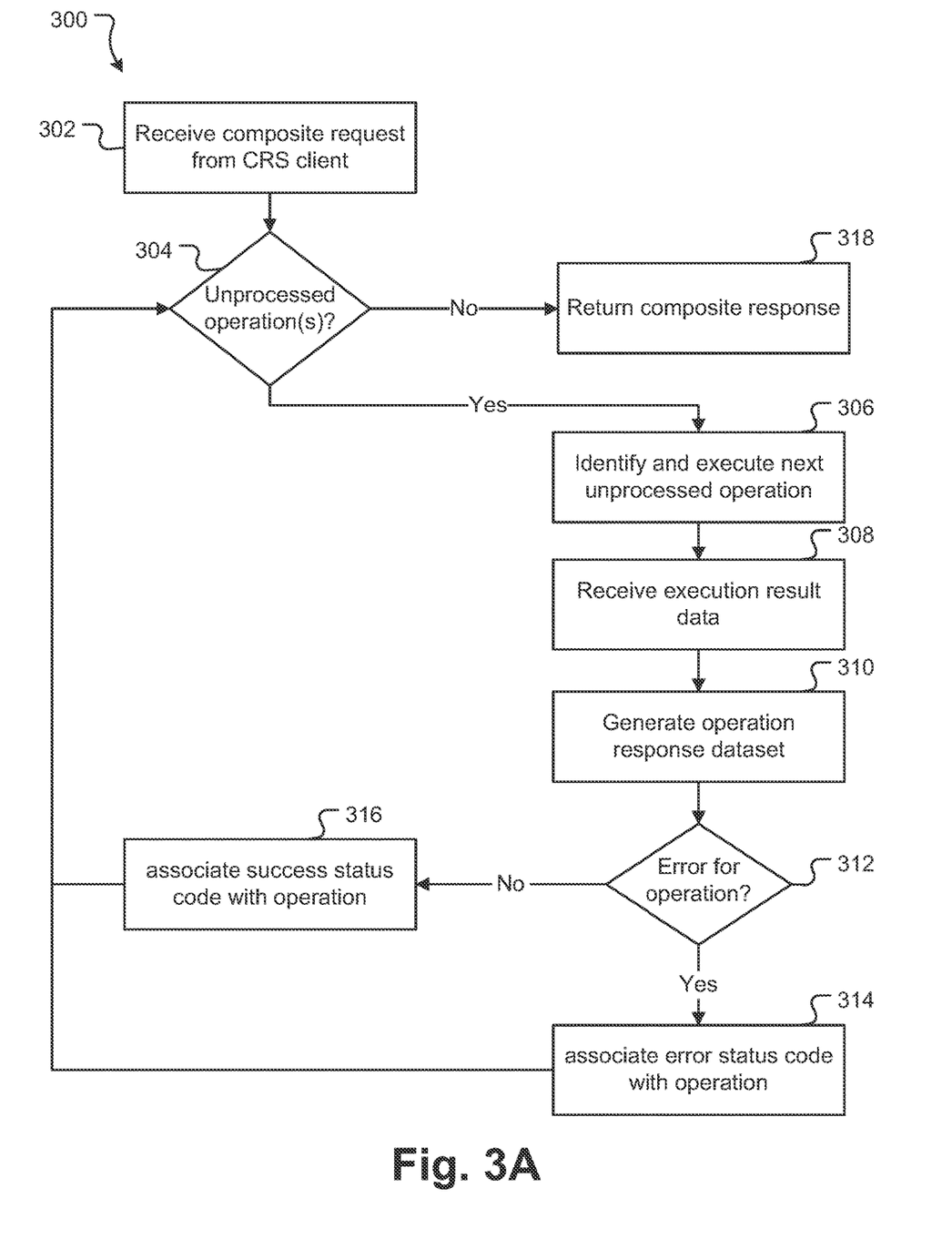
FIG. 3A is a flowchart illustrating operations performed to generate a composite response.

FIG. 3A illustrates processing performed by a computer processing system to generate a composite response that includes status codes. In the example process 300 are performed by the CRS server 121. In alternative embodiments the processing described may be performed by one or more alternative systems (operating in conjunction with CRS server 121 or independently) and/or alternative applications/modules running on those systems.

At 302, the CRS server 121 receives a composite request from a CRS client module 108B. The manner in which a composite request is generated by the client module 108B (and the form of the composite request) will depend on the particular composite architecture being used. For example, if GraphQL is being used a GraphQL request (involving one or more queries, mutations or subscriptions) is generated.

The composite request received at 302 includes one or more operations. An operation may be, for example, involve fetching an object in a query or nested query.

At 304, the CRS server 121 determines if there are any unprocessed operations in the composite request.

If, at 304, there are any unprocessed operations in the composite request, the CRS server 121 identifies and executes 306 a next unprocessed operation in the composite request. Execution of an operation can involve the CRS server 121 performing one or more server-side processes involving one or more server side resources 130 such as, for example, database server 130A, database 130B server, and/or authentication server 130C. Other non-illustrated resources may be used to execute an operation.

At 308, the CRS server 121 receives execution result data from the one or more server side resources 130 used to execute the operation.

At 310, the CRS server 121 generates an operation response dataset for inclusion in the composite response being generated. (Where 310 is performed for the first time in respect of a given composite request, the CRS server 121 may also generate the framework for the composite response).

The operation response dataset in this context includes any data requested by the operation. For example, if the operation requests a particular object and that object is returned as a result of executing the operation, the operation response dataset is the returned object. An operation response dataset can be null—for example where a server-side resource error has occurred (preventing the operation from being performed) or an alternative error has occurred (e.g. where the relevant server-side resource is responsive but the operation does not result in any data, such as a request for a non-existent object).

By way of example, in the GraphQL context the response format schema defines a "data" keyword which defines an object. The operation response datasets described can be included within the data object as elements thereof.

At 312, the CRS server 121 examines the execution result data received at 308 to determine whether an error has occurred in execution of the operation.

If, at 312, the execution result data indicates an error has occurred, the CRS server 121 associates 314 an error status code with the operation. The associated error status code may be different for different errors. For example, if the error indicates that a database or database application timed out, the associated error status code could be a HTTP 500 status code. The CRS server 121 determines, based on the error, a HTTP status code to be associated with the operation.

While the present disclosure describes the association of HTTP error status codes with operations, the CRS server 121 may be configured to associate any error code (HTTP or otherwise) with an operation. In certain cases, associating HTTP error status codes is convenient as a monitoring component 140 may already be configured to interpret and process such codes. A monitoring component may, however, be configured to interpret and respond to alternatively defined codes. As a simple example CRS server 121 may be configured to associate a time-out with the code TO, and monitoring component 140 may be configured to associated that code 'TO' with a time out event. By defining its own codes (and configuring a monitoring component 140 to interpret those codes) CRS server 121 can provide a richer (or, at least, alternative) set of error/response data than is currently provided by HTTP response codes.

In some implementations, the status code that is determined for a given error is based on how the operation is executed. For example, if the operation is executed via REST, then the HTTP status code can be mapped across. In other cases, it is possible to associate an HTTP (or other) status code based on what has occurred. For example, if there was an error because the record already exists, then a HTTP status code of '400' (or similar) can be associated with the operation. If the database was down then the HTTP status code would be more likely to be '500' (or similar). In other cases, it may be a case by case determination of the most appropriate HTTP status code to associate for the error that has occurred.

In certain implementations, if the execution result does not indicate an error at 312, the CRS server 121 associates a success status code with the operation at 316. For example HTTP '200 OK' represents the standard successful response. In another example, HTTP '204 No Content' means that the server successfully processed the request but did not return any content.

In alternative implementations, if the execution result does not indicate an error at 312 the CRS server 121 does not associate any status code with the operation.

Associating an error or success status code with an operation can be performed in various ways. In the present implementation, association of an error or success status code is achieved by writing the status code to an error dataset within the composite response—for example to a dedicated StatusCode field.

By way of more specific example, in the GraphQL context associating an error or success status code with an operation can be achieved by use of the error list defined by the GraphQL specification. Per the below example, the errors list includes an 'extensions' entry, the value of which is a map (or key/value pair). Within the extensions map a further StatusCode key/value pair may be defined and used to store the status code. For example, an example GraphQL composite response is provided below:

```
{
  "data":{ ...}
  "errors":
  [
    {
      "message": "...",
      "locations":[{...}],
      "path":[...],
      "extensions":{
        "StatusCode": 409,
      },
    },
    {
      "message": "...",
      "locations":[...],
      "path":[...],
      "extensions":{
        "StatusCode": 200,
      },
    }
  ]
}
```

Following association of an error or success (if performed) status code with the operation at 314 or 316, processing returns to 304 to determine whether any further unprocessed operations exist in the composite request.

If, at 304, there are no unprocessed operations in the composite request, the CRS server 121 proceeds to 318 to return the composite response.

The composite response includes any operation response data (written to the composite response at 310) along with any error/success status codes generated at 314 or 316.

For example, a successful operation requiring fetching an object in a query may have a corresponding response item with result data (written into the response item at 310) representing the fetched object and an associated status code (written into the response item at 316) indicating success. In contrast, an unsuccessful operation requiring fetching an object in a query may have a corresponding response item with null result data and an associated status code (written into the response item at 314) indicating the nature of the failure.

In certain embodiments, the CRS server 121 returns the composite response directly to the requesting client. In alternative embodiments, the CRS server 121 passes the composite response to a monitoring module such as 118 for processing, as described below. In still further embodiments, the return the CRS server 121 passes the composite response to both the requesting client and a monitoring module such as 118.

Figure 3B:
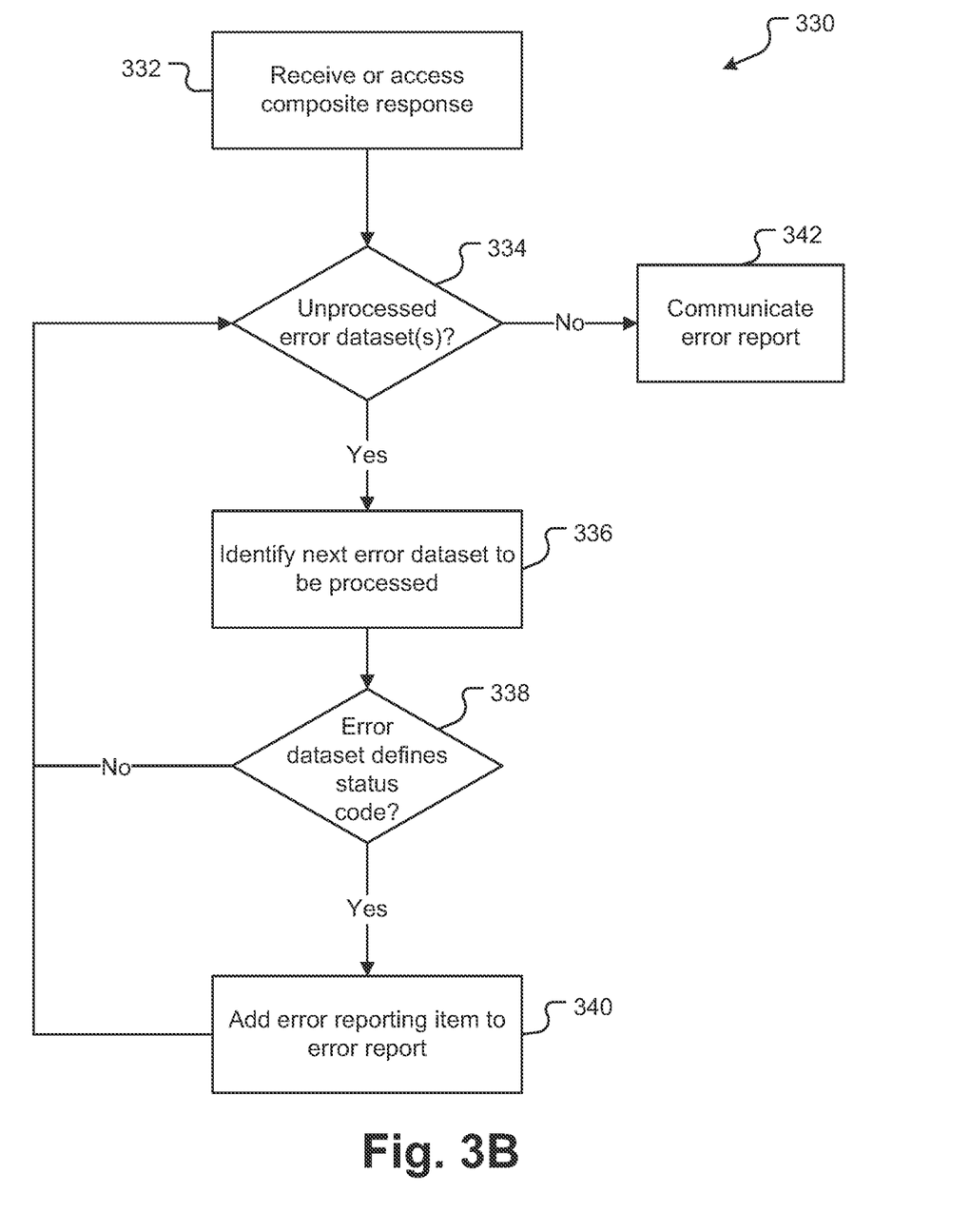
FIG. 3B is a flowchart illustrating operations performed to generate a report for use in monitoring server-side resources.

Turning to FIG. 3B, a computer implemented process 330 for reporting errors to monitoring component (such as 140) will be described. FIG. 3b illustrates processing performed by a computer processing system. In the present implementation, the operations of process 330 are performed by the monitoring module 118. In alternative embodiments the processing described may be performed by one or more alternative systems (operating in conjunction with CRS server 121 or independently) and/or alternative applications/modules running on those systems.

At 332, the monitoring module 118 receives or accesses a composite response. The composite response can include both response data (in one or more response datasets) and error data (in one or more error datasets). The composite response may be generated by a CRS server application 122 as described with reference to FIG. 3A above. The CRS server 121 may provide the composite response directly to the monitoring module 118 or the monitoring module 118 may inspect the composite response prior to the composite response being sent to the client module (such as CRS client module 108B).

At 334, the monitoring module 118 determines if there are any unprocessed error datasets in the composite response. If, at 334, there is one or more unprocessed error dataset in the composite response, processing continues to 336.

At 336, the monitoring module 118 identifies a next error dataset in the composite response to be processed.

At 338, the monitoring module 118 examines the error dataset identified at 336 to determine whether defines a status code.

If, at 338, the monitoring module 118 determines that the error dataset does not define a status code, processing returns to 334 to determine whether further unprocessed response items exist.

If, at 338, the monitoring module 118 determines that the error dataset does define a status code, processing continues to 340. At 340, the monitoring module 118 extracts the status code and adds it to an error reporting item in an error report (initially generating the error report if it does not yet exist).

The monitoring module 118 generates the error report (and error reporting items) in a format that is expected by whichever monitoring component 140 the report is to be communicated to. In the present examples, monitoring component 140 is one performs its monitoring functions based on HTTP status codes. Accordingly, the error reporting item includes the HTTP status codes (and any relevant or required associated information) in an appropriate reporting format for the given monitoring component 140.

Following 340, processing returns to 334 to determine whether any further unprocessed error datasets exist in the composite response.

If, at 334, all response items in the composite response have been processed, processing continues to 342. At 342, the monitoring module 118 communicates the error report to the monitoring component 140.

In some embodiments, a predefined status code priority order is maintained based, for example, on the severity of an error. In this case, where a given composite response has multiple response items associated with multiple status codes, only the highest priority status code is reported to the monitoring component 140. For example, a response item that has status codes of both '500' and '410' will be reported as '500'. In other embodiments, all status codes may be reported.

Many monitoring tools are built around HTTP status codes. For example, the monitoring and alerts that in some applications, such as Micros, have several cloud watch alarms that look for '500' status code errors. Where HTTP status codes are generated and reported, monitoring components or tools that rely on HTTP status codes can operate without requiring any modification.

As noted above, the composite response itself may be associated with a composite response HTTP status code (e.g. 503 if the CRS server 121 is itself down). The composite response HTTP status code is a success indicator relating to the composite response as a whole, and therefore does not provide information about how successful or otherwise each of the operations or server-side processes triggered by the composite request were. In some implementations, if the composite response HTTP status code indicates successful communication with the CRS server 121 it is ignored. If the composite response HTTP status code indicates a failure, this is interpreted (and reported as) the CRS server 121 itself failing. In this case the composite response may be empty, and the client module 108B may generate or resend the composite request again to the CRS server.

Figure 4:
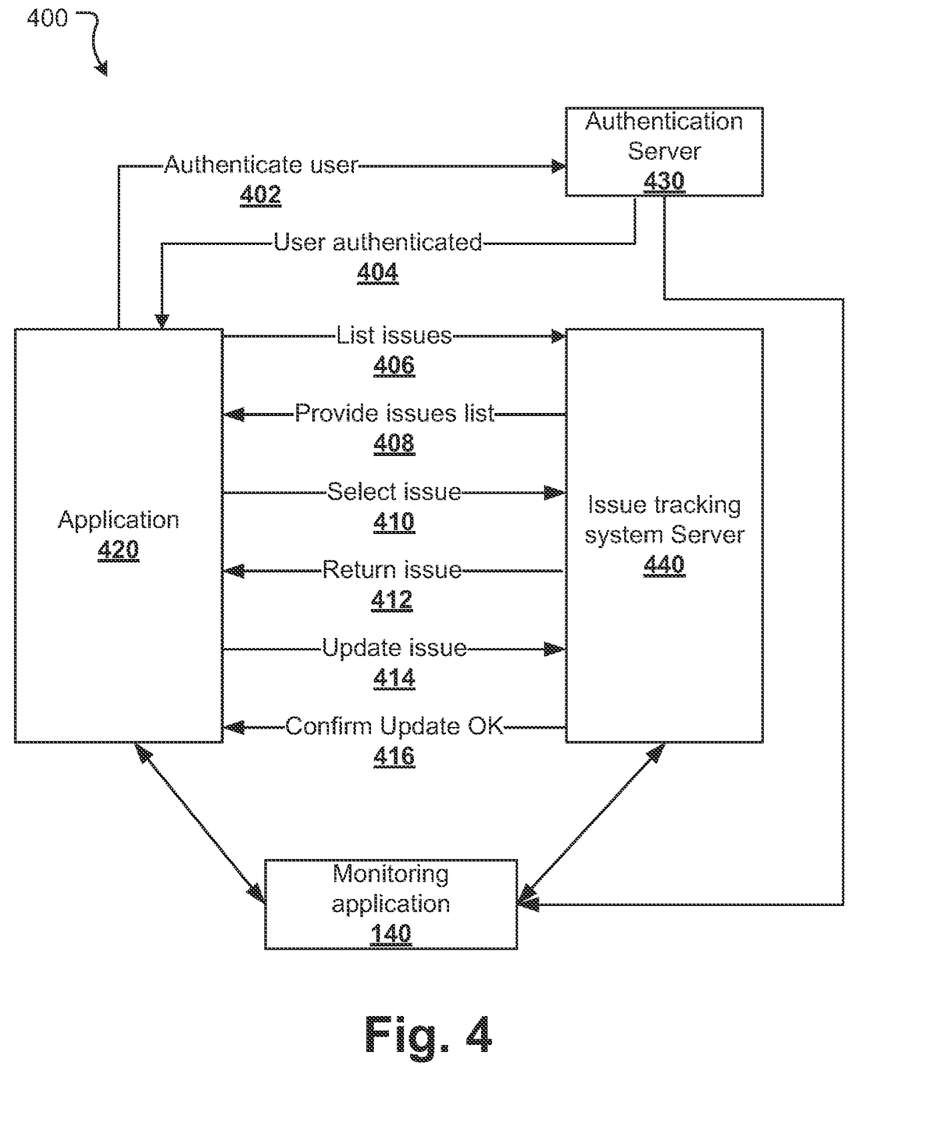
FIG. 4 is an example illustration of monitoring web responses in a non-composite request system.

FIG. 4 illustrates an example of how monitoring operates in a non-composite system (e.g. a REST based system where each query or web request to a server is handled individually).

In the example of FIG. 4, which is an illustration of the use of an issue tracking system, there are two servers that the client application 420 is interacting with: authentication server 430 and issue tracking server 440. Two servers are illustrated in this example to show how the servers operate in conjunction with each other (and, per the following example of FIG. 5, how composite request systems operate in conjunction with each other).

In the example of FIG. 4, the client is seeking to identify and update an issue but, in order to do so, needs to be authenticated first.

In the example in FIG. 4, the application 420 is a client in a typical client-server web-based architecture. A client such as the application 420 goes through the following cycle when it communicates with the authentication server 430 or issue tracking server 440: 1. Obtain an Internet Protocol (IP) address from the IP name of the site. This involves the conversion of IP name to IP address is provided by domain name servers (DNSs); 2. Open an IP socket connection to that IP address; 3. Write an HTTP data stream through that socket; 4. Receive an HTTP data stream back from the Authentication server 430 or issue tracking server 440 in response. This data stream contains (in this example) status codes whose values are determined by the HTTP protocol. The application 420 parses this data stream for status codes and other useful information.

An error 500 occurs in the final step above when the client receives an HTTP status code that it recognises as "500". In the example in FIG. 4, each of the steps 402 to 414 correspond to a single HTTP request.

At 402, application 420 request authentication and at 404 the authentication server 430 returns a user authenticated response.

At 406, application 420 then requests the issue tracking server 440 to list issues.

At 408, the issue tracking server responds by providing the list of issues requested.

At 410, application 420 selects an issue.

At 412, the issue tracking server 440 responds with the issue as identified.

At 414, the application 420 updates the issue.

At 416, the issue tracking server 440 responds to the application 420 to confirm the issue has been updated.

In this example scenario, the monitoring component 140 can interact with either the application 420 or the issue tracking server 440 or both to determine if a given web request 402 to 416 has been successful. From a monitoring perspective, therefore, it is possible to see if each individual request succeeds or fails based on a HTTP status code (such as: 200, which means OK; 400, which means bad request; and 500, internal server error). The monitoring component 140 can therefore monitor whether any of the requests returned a 500 error code for example.

Figure 5:
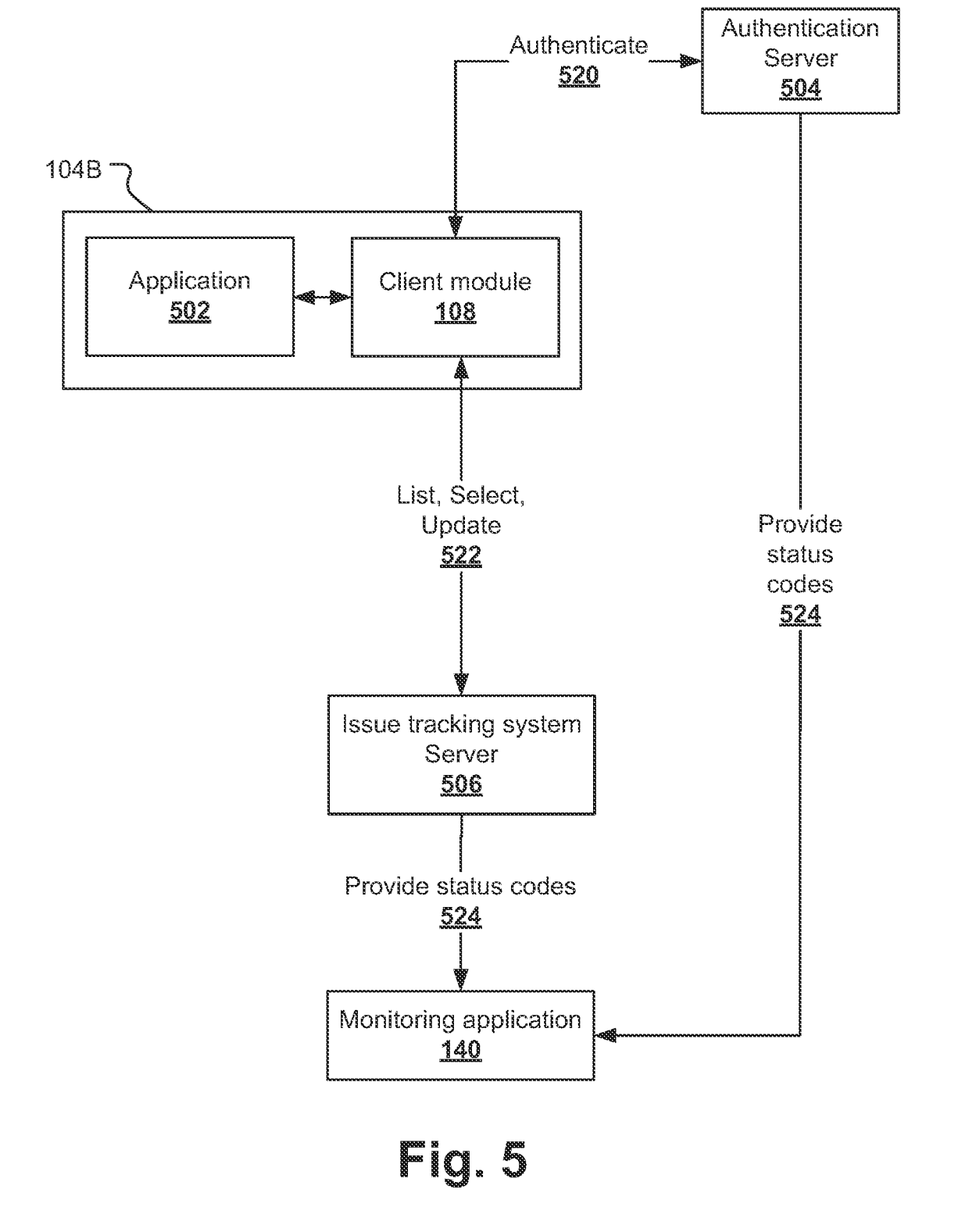
FIG. 5 is an example illustration of monitoring web responses with composite request systems.

Example 500 provides an alternative example 500 in which issue tracking system 506 is a composite request system. In this example, as with the previous example, the client application 502 is seeking to identify and update an issue maintained by the issue tracking server 506. Again, in order to do so, the user needs to be authenticated first.

In this example, authentication server 504 and issue tracking server 506 are CRS servers as described above.

At 520, the client module 108 provides an authenticate request to the authentication server 504 and the authentication server 504 returns an authentication response.

At 522, the client module 108 then generates and communicates a composite query defining an operation (or operations) to perform the list, select and update to the issue tracking server 506. The issue tracking server 506 receives and processes the composite query and responds with a composite response that includes multiple items, each corresponding to the list, select and update commands.

The issue tracking server 506 then processes the composite response as described above to determine any status codes and at 524 reports these to the monitoring component 140.

As described above, one mechanism by which the present disclosure can be implemented is to configure the CRS server 121 to generate composite responses that include error information indicating, for example, HTTP status codes.

This section provides further examples of such composite responses within the GraphQL context.

Below is an example GraphQL composite request:

```
{
  agile {
    board {
      id
    }
  }
  roadmap(projectIdOrKey: "34534dsfkljs") {
    roadmapStatusCategories {
      id
    }
    roadmapItems {
      edges {
        node {
          id
          parentId
        }
      }
    }
  }
}
```

Such a request could result in generation of a composite response such as:

```
{
  "data":
  {
    "agile": {
    "board": null
    },
    "roadmap": {
      "roadmapStatusCategories":
      [
      {"id": "1"},
      {"id": "2"},
      {"id": "4"},
      {"id": "3"}
      ],
      "roadmapItems": null
    }
  },
  "errors":
  [
      {
        "message": "Board ID required for query",
        "locations": [{"line": 31, "column": 5}],
        "path": ["agile", "board"],
        "extensions": {
          "status": ["unknown"]
        }
      },
```

```
      },
      {
        "message": "...No project could be found with key '34534dsfkljs'...",
        "locations": [{"line": 39, "column": 5}],
        "path": ["roadmap", "roadmapItems"],
        "extensions": {
          "status": [400]
        }
      }
  ]
}
```

As a further example, a composite response to a to fetch character names based on identifiers, but which includes an invalid character identifier, could be as follows:

```
{
  "errors": [
    {
      "message": "Name for character with ID 1002 could not be fetched.",
      "locations": [{"line": 6, "column": 7}],
      "path": ["hero", "heroFriends", 1, "name" ],
      "extensions": {
        "statusCode": 404,
      },
    }
  ],
  "data": {
    "hero": {
      "name": "R2-D2",
      "heroFriends": [
        {
          "id": "1000",
          "name": "Luke Skywalker"
        },
        {
          "id": "1002",
          "name": null
        },
        {
          "id": "1003",
          "name": "Leia Organa"
        }
      ]
    }
  }
}
```

As a further example, a composite response to a request to update a password that has resulted in validation errors could be as follows:

```
{
  "errors": [
    {
      "message": "Password should contain at least one number",
      "locations": [{"line": 4, "column": 6} ],
      "path": ["currentUser", "password" ],
      "extensions": {
        "statusCode": 400,
      },
    },
    {
      "message": "Password should contain at least one special character",
      "locations": [{"line": 4, "column": 6} ],
      "path": ["currentUser", "password" ],
```

```
            "extensions": {
               "statusCode": 400,
            },
         }
      ]
}
```

As a further example, a composite response to a request to create a new group with a number of users could be as follows:

```
{
   "errors": ]
      {
         "message": "Group with name 'my-awesome-group' already exists",
         "locations": [{"line": 3, "column": 7} ],
         "path": ["group", "name" ],
         "extensions": {
            "statusCode": 409,
         },
      },
      {
         "message": "User with ID 101 could not be added to the group",
         "locations": [{"line": 10, "column": 6} ],
         "path": ["group", "users", 4],
         "extensions": {
            "statusCode": 409,
         },
      }
   ]
}
```

Figure 6:
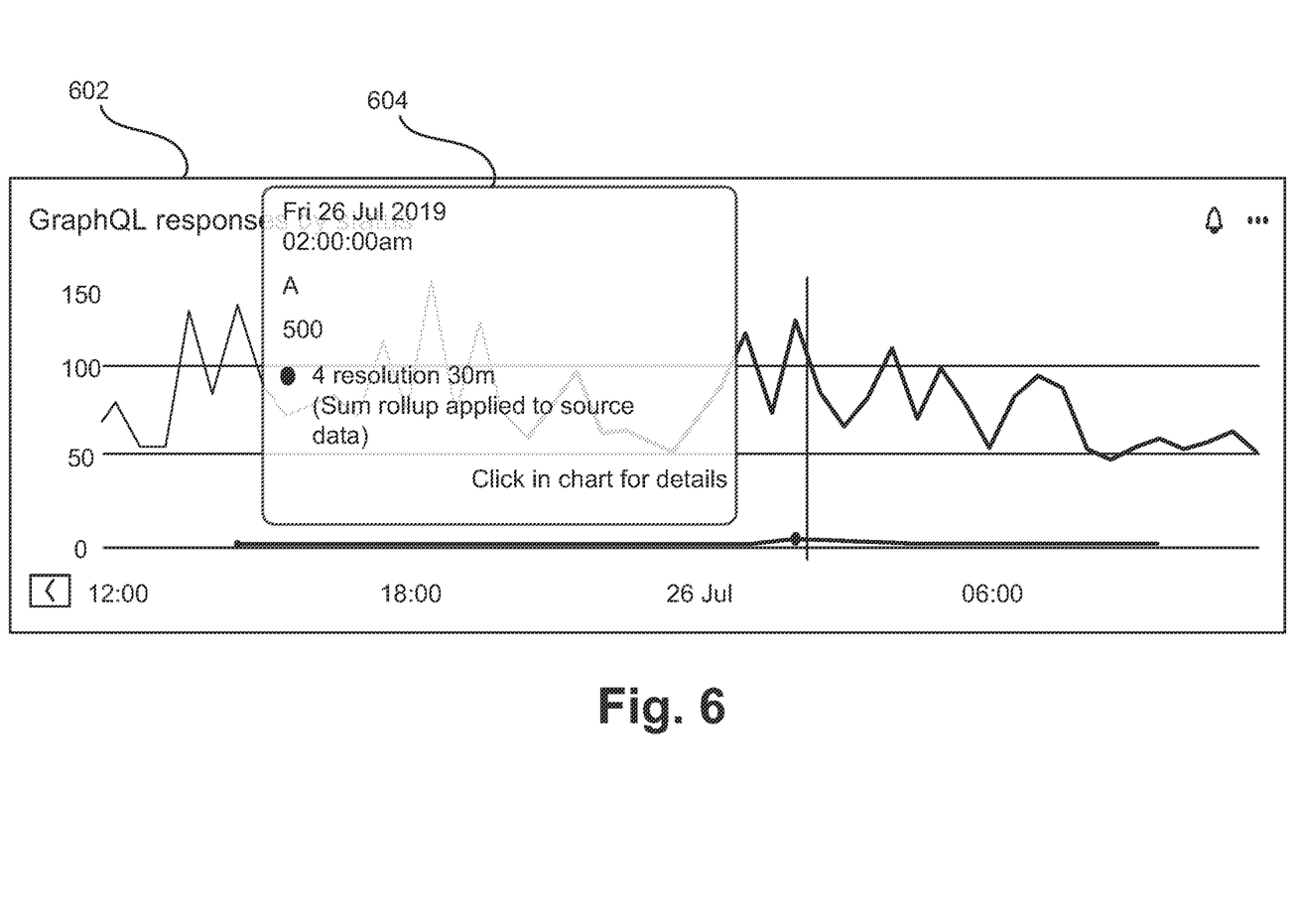
FIG. 6 is an example output from a monitoring component used with composite request systems.

FIG. 6 illustrates an example output 602 from a monitoring component 140. In this example, the monitoring component has been receiving HTTP status codes over an 18 hour period from 25 Jul. 2019 to 26 Jul. 2019.

The dialog box 604 presented in the output 602 indicates that at 2 am there were 4 responses that were associated with a 500 HTTP status code, which represents an error status code. The other response items received during the window at 2 am were not associated with error status codes.

It should be noted that CRS architectures can make use of other, non-http communication protocols. Regardless of the underlying protocol used (HTTP or otherwise), the techniques described herein can be used to generate a composite response that includes HTTP (or other) status codes—for example by determining an appropriate http status code that corresponds to whatever execution result is generated by performing an operation. Such composite responses can then be processed as described and error reports generated/communicated to status code monitoring tools—i.e. tools that make use of (and require) status codes to perform monitoring.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for generating a composite response, the method comprising:
   receiving, from a client system, a composite request defining one or more operations; and
   generating a composite response in respect of the composite request by, for each operation in the composite request:
      executing the operation using one or more server side resources;
      receiving execution result data from the one or more server side resources in response to execution of the operation;
      writing operation response data to the composite response, the operation response data based on the execution result data;
      determining a status code for the operation based on the execution result data, the status code providing information on at least one of the one or more server side resources used to execute the operation; and
      associating the status code with the operation response data in the composite response.

2. The computer implemented method according to claim 1, wherein the status code is a HTTP status code.

3. The computer implemented method according to claim 1, wherein the status code indicates an error that occurred in executing the operation.

4. The computer implemented method according to claim 1, wherein the status code indicates no error occurred in executing the operation.

5. The computer implemented method according to claim 1, wherein association of a status code with a given operation comprises writing the status code as a value of dedicated status code field in the composite response.

6. The computer implemented method according to claim 1, wherein the composite request is a GraphQL request.

7. The computer implemented method according to claim 1, wherein the composite response is communicated to a monitoring module.

8. The computer implemented method according to claim 1, wherein the composite response is communicated to the client system.

9. A computer processing system comprising:
   a processing unit;
   a communication interface; and
   a non-transitory computer-readable storage medium storing instructions which, when executed by the processing unit, cause the processing unit to,
      receive, from a client system, a composite request defining one or more operations; and generate a composite response in respect of the composite request by, for each operation in the composite request:
: executing the operation using one or more server side resources;
receiving execution result data from the one or more server side resources in response to execution of the operation;
writing operation response data to the composite response, the operation response data based on the execution result data;
determining a status code for the operation based on the execution result data, the status code providing information on at least one of the one or more server side resources used to execute the operation; and
associating the status code with the operation response data in the composite response.

10. The computer processing system according to claim 9, wherein the status code is a HTTP status code.

11. The computer processing system according to claim 9, wherein the status code indicates an error that occurred in executing the operation.

12. The computer processing system according to claim 9, wherein the status code indicates no error occurred in executing the operation.

13. The computer processing system according to claim 9, wherein association of a status code with a given operation comprises writing the status code as a value of an key/value error pair in the composite response.

14. The computer processing system according to claim 9, wherein the composite request is a GraphQL request.

15. The computer processing system according to claim 9, wherein the composite response is communicated to a monitoring module.

16. The computer processing system according to claim 9, wherein the composite response is communicated to the client system.

17. A non-transitory storage medium storing instructions executable by a processing unit to cause the processing unit to:
receive, from a client system, a composite request defining one or more operations; and
generate a composite response in respect of the composite request by, for each operation in the composite request:
: executing the operation using one or more server side resources;
receiving execution result data from the one or more server side resources in response to execution of the operation;
writing operation response data to the composite response, the operation response data based on the execution result data;
determining a status code for the operation based on the execution result data, the status code providing information on at least one of the one or more server side resources used to execute the operation; and
associating the status code with the operation response data in the composite response.

18. The non-transitory storage medium according to claim 7, wherein the status code is a HTTP status code.

19. The non-transitory storage medium according to claim 9, wherein the status code indicates an error that occurred in executing the operation.

20. The non-transitory storage medium according to claim 9, wherein the status code indicates no error occurred in executing the operation.

* * * * *